US007891088B2

(12) United States Patent
Robinett et al.

(10) Patent No.: US 7,891,088 B2
(45) Date of Patent: Feb. 22, 2011

(54) METHOD OF RUNNING CABLE FROM A DUCT TO A DEVICE

(75) Inventors: Doug Robinett, Overland Park, KS (US); Todd Daugherty, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 298 days.

(21) Appl. No.: 12/113,465

(22) Filed: May 1, 2008

(65) Prior Publication Data
US 2008/0203238 A1    Aug. 28, 2008

Related U.S. Application Data

(60) Division of application No. 10/992,341, filed on Nov. 18, 2004, now Pat. No. 7,383,628, which is a continuation-in-part of application No. 10/896,266, filed on Jul. 21, 2004, now Pat. No. 7,140,578.

(51) Int. Cl.
*H01B 13/20*    (2006.01)
*F16L 5/00*     (2006.01)

(52) U.S. Cl. .............................. 29/828; 29/829; 29/835; 29/868; 29/866; 248/56

(58) Field of Classification Search ............. 29/868, 29/866, 835, 837, 749, 828, 829; 81/311, 81/305, 325; 83/862, 872, 887; 30/92, 96.95, 30/105; 248/68.1, 49, 56
See application file for complete search history.

(56) References Cited

U.S. PATENT DOCUMENTS 3,861,035 A * 1/1975 Ramey et al. .................. 30/92
4,163,572 A * 8/1979 Benscoter ................ 285/284.1
4,625,480 A * 12/1986 Nusbaum .................... 174/486
6,634,605 B2 * 10/2003 Bernard et al. ............. 248/68.1

* cited by examiner

*Primary Examiner*—Derris H Banks
*Assistant Examiner*—Tai Nguyen

(57) ABSTRACT

Embodiments provide a method of running cables from an already-installed cable duct to devices. According to the method, a portion of a duct from which it is desirable for cable to be dropped is selected upon consideration of a first location of a first device to which a connection is desired. The method also includes punching a first aperture in the duct proximate the first portion, snaking a first cable from the duct through the first aperture, and connecting the first cable to the first device.

7 Claims, 7 Drawing Sheets

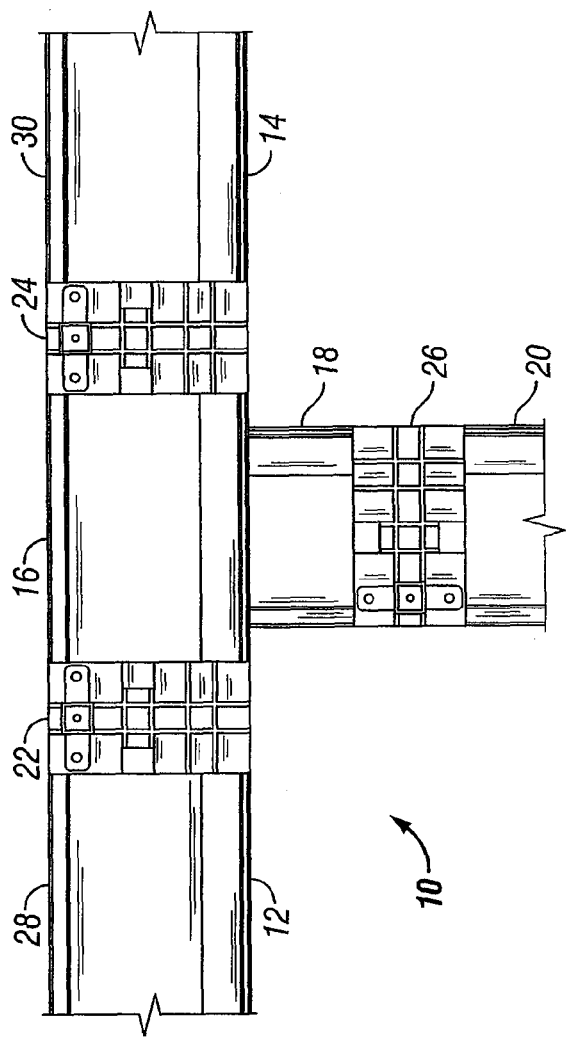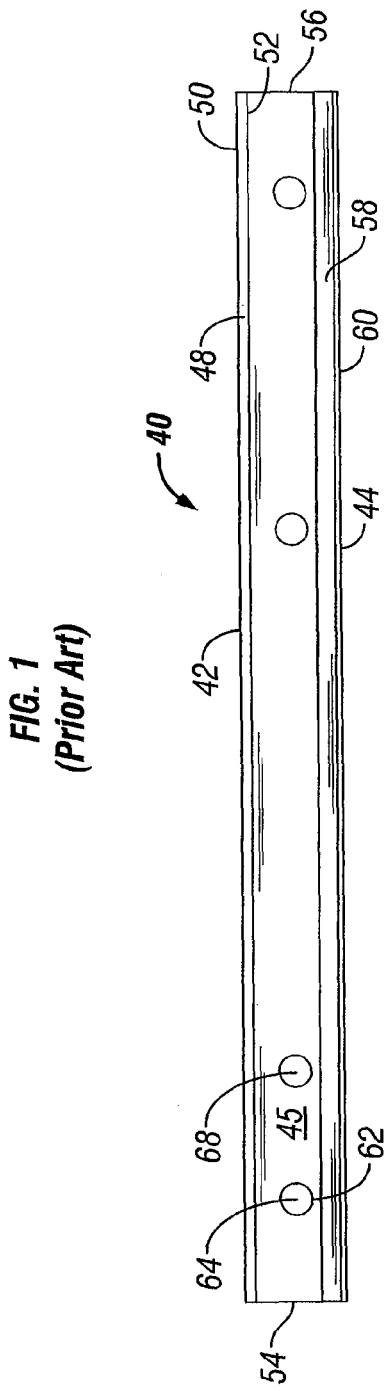

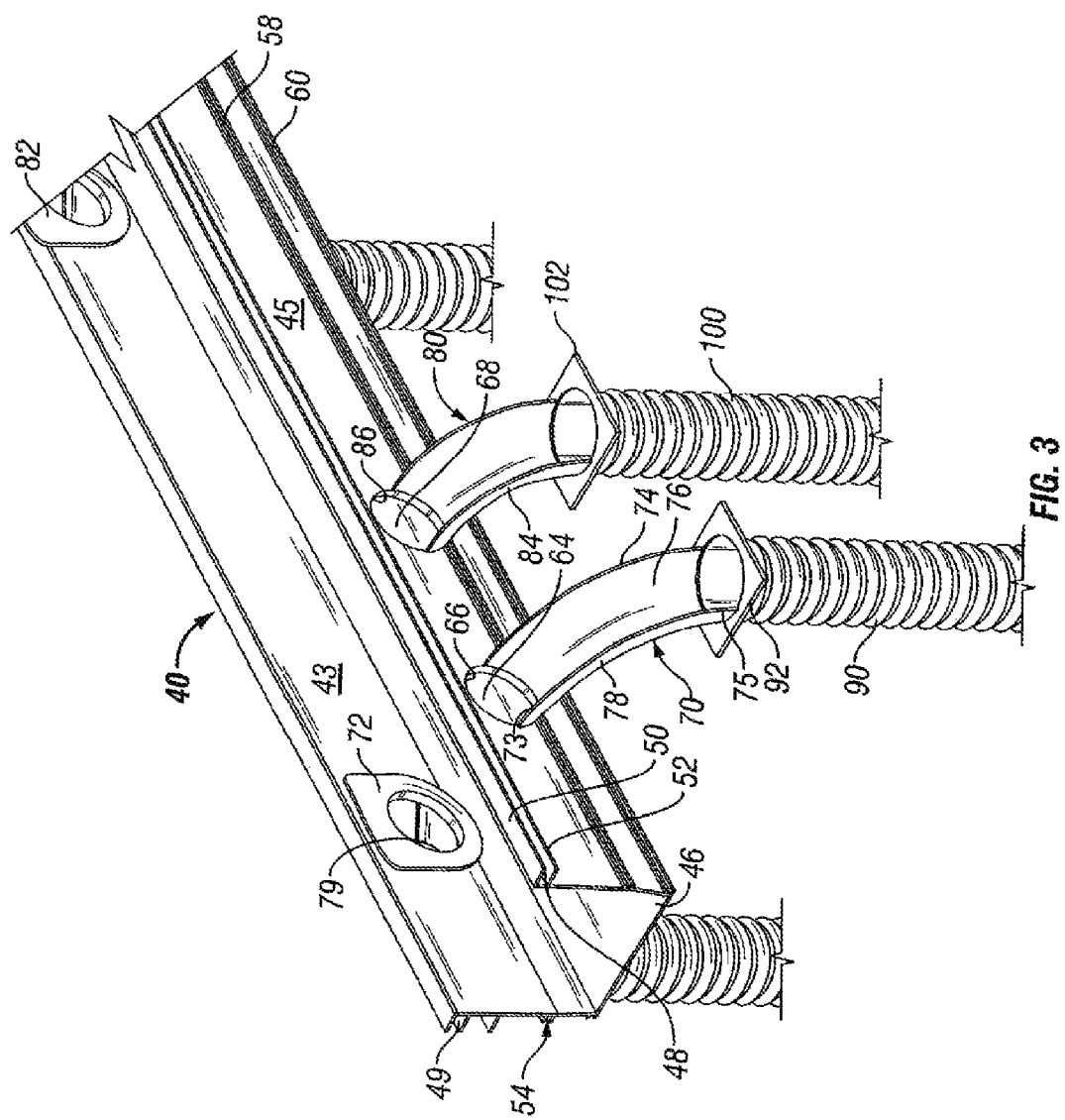

7,891,088 B2

METHOD OF RUNNING CABLE FROM A DUCT TO A DEVICE

CROSS-REFERENCE TO RELATED APPLICATIONS

This application is a divisional of and claims priority pursuant to 35 U.S.C. Section 120 from U.S. patent application Ser. No. 10/992,341, filed Nov. 18, 2004 now U.S. Pat. No. 7,383,628, which is a continuation in part of U.S. patent application Ser. No. 10/896,266, filed Jul. 21, 2004, issued Nov. 28, 2006 as U.S. Pat. No. 7,140,578.

STATEMENT REGARDING FEDERALLY SPONSORED RESEARCH OR DEVELOPMENT

Not applicable.

TECHNICAL FIELD

This invention relates to the field of routing, protecting, and concealing cabling. More specifically, the present invention is directed to the practice of dropping cables from raceway duct systems to computing or other equipment.

BACKGROUND OF THE INVENTION

Raceway duct systems are used to route, protect and conceal cabling. This cabling may comprise data, voice, video, fiber optic, or power cabling. This type of duct system can have numerous configurations. The most typical kind of ducting occurs in longitudinal sections. These sections form a trough and sometimes come with lids. There are also a variety of other types of sections included with these systems, such as 90° elbows, 45° elbow fittings, t-fittings, four way intersections (or x-sections), and others. These systems often times run the cable through ducts which are run along the ceiling in a facility. The type of facility referred to might be, e.g., a telecommunications facility, or a computer equipment center office. These types of facilities often include numerous, often time hundreds or thousands of computing equipment racks. The duct work is used to deliver the cables to the appropriate pieces of equipment in these racks. Because the cabling is run along the ceiling of such facilities, the cabling must be "dropped" to the equipment.

The prior art techniques for dropping cable to equipment from a ceiling duct system are labor intensive and costly. The most common technique used to accomplish this is disclosed in prior art FIG. 1. Referring to the figure, we see a prior art fiber optic raceway system with a cable drop assembly 10. These types of prior art systems are used to drop cabling between two standard ducts. These ducts are first standard duct 12 and second standard duct 14. Each of these will be well known to those skilled in the art as common 4 inch trough-type ducts which are usually sold in 6 foot sections. These trough sections have 4 inch sides and a four inch floor (all in cross section). They are typically constructed in durable plastic and are rather thick. In fact, they are usually manufactured with a thickness of ⅛ inch, which makes this type of duct very durable. This protects the cable from trauma and fire. But its thickness makes it virtually impossible to cut with a standard utility knife, or other cutting equipment which might be available to technicians in the field.

The prior art methods involve the time consuming method of creating a drop at a junction between two existing in the ducts. Referring to FIG. 1, first and second ducts, 12 and 14 respectively, are normally connected using a single connector.

This kind of connector is often referred to as a junction kit by those skilled in the art. Junction kits are used snap fit two longitudinal together. For example, two 6 foot sections can be snapped together to form a continuous 12 foot section.

Occasionally, it will be necessary to access some of the cables running through the two sections and deliver them to equipment below. This equipment is usually located in what are known as telecommunications or server racks.

FIG. 1 shows a prior art technique of dropping cables in such a circumstance. When it is necessary to drop a group of cables (a subcomponent of the plurality presently included in the duct) the technician will install a drop unit 16 in between ducts 12 and 14. Drop unit 16 is T-shaped and is used to drop the cables which have been separated from the bundle to be delivered to equipment below. The dropping occurs through a lower portion 18. Lower portion 18 enables the cable to run down to the equipment, e.g., server racks, routers, and other telecommunications or computing equipment. The techniques for doing this will be well known to those skilled in the art. T-shaped drop units like that shown as drop unit 16 are readily available in the market. Both ends of the "T" in junction 16 are connected to ducts 12 and 14 using a first junction kit 22 and a second junction kit 24, respectively. First junction kit 22 and second junction kit 24 are commercially available. They are each used to snap the junction in between the ducts. A third junction kit 26 may be used to connect the lower part of the T to a vertical duct 20. Vertical duct 20 may be used to direct the cabling downward to protectively access it to the equipment it is designated for.

After vertical duct 20, the cabling being dropped will be inserted into what is known to those skilled in the art as corrugated (or ribbed) split tubing. Corrugated split tubing comes having a one inch, two inch, or sometimes even three inch inside diameter. Thus, it forms a conduit having a smaller cross sectional smaller size than the ducts have. This split tubing is also split along its length to allow access for inserting and removing cables. Primarily, this tubing is used to direct the cables to their particular destinations in smaller bundles once freed from the duct.

During the process it is important that the fiber optic cable not be bent to a great extent. Otherwise the fiber optic cable may become damaged and will not function properly. Thus, manufacturers usually set a threshold radius of curvature under which the cable should not be bent. This is accomplishable with FIG. 1 type systems, but not always easy.

The installation of the drop cabling systems such as that shown in FIG. 1 is extremely time consuming. It may take the average technician over 24 hours to complete the drop of a small number of cables. This creates significant human resource issues and costs.

Another negative is the cost of these systems. The drop unit 16, and the three junction kits 22, 24, and 26 are somewhat expensive. Much more expansive than the simple straight ducting and split tubing. This in many cases, makes the FIG. 1 process, though effective in protecting the cabling, unreasonably expensive.

Besides the FIG. 1 system, another prior art technique exists. This alternative system is known commercially as an Express Exit™ system. It is sold by ADC, Inc. This ADC system lifts the selected cables, which are intended to be dropped out from above the duct. Once the dropped cables are raised out from above the duct, they are directed to specified equipment below in protective ducting or ribbed split tubing. The ADC product, however, has proved to be a difficult system to use. Especially in situations in which the space within the technician is allowed to work above the duct is limited. In many situations, the technician will be precluded from using the ADC system because there is insufficient work space above the duct (which typically runs along the ceiling of the facility). Furthermore, the installation of the ADC system has proven to be labor intensive, and it has significant part costs—much like the system disclosed in FIG. 1.

Therefore, there is a need in the art for technique that is much easier and less time consuming, but still allows for the adequate protection of cables being dropped out of an overhead, or otherwise placed duct.

SUMMARY OF THE INVENTION

The present invention overcomes the above-stated disadvantages in the prior art systems by providing a punch tool which can be used to create apertures in the sides (or elsewhere) in a duct. The punch tool has two opposed jaws and cable duct system of the present invention may also involve the use of knockout sections which form the apertures. The tool can be used to create holes in the sides or floor of the duct at any location. This enables the user to easily drop cables at any position to reach the equipment below.

BRIEF DESCRIPTION OF THE SEVERAL VIEWS OF THE DRAWINGS

The present invention is described in detail below with reference to the attached drawing figures, wherein:

FIG. 1 is a side view of a conventional system for dropping cable from a fiber-optic cable raceway;

FIG. 2 is a side view of the duct subjected to the processes of the present invention;

FIG. 3 is a perspective view of one end of the FIG. 2 duct in use enabling the dropping of cables to computing equipment;

DETAILED DESCRIPTION OF THE INVENTION

Figure 4:
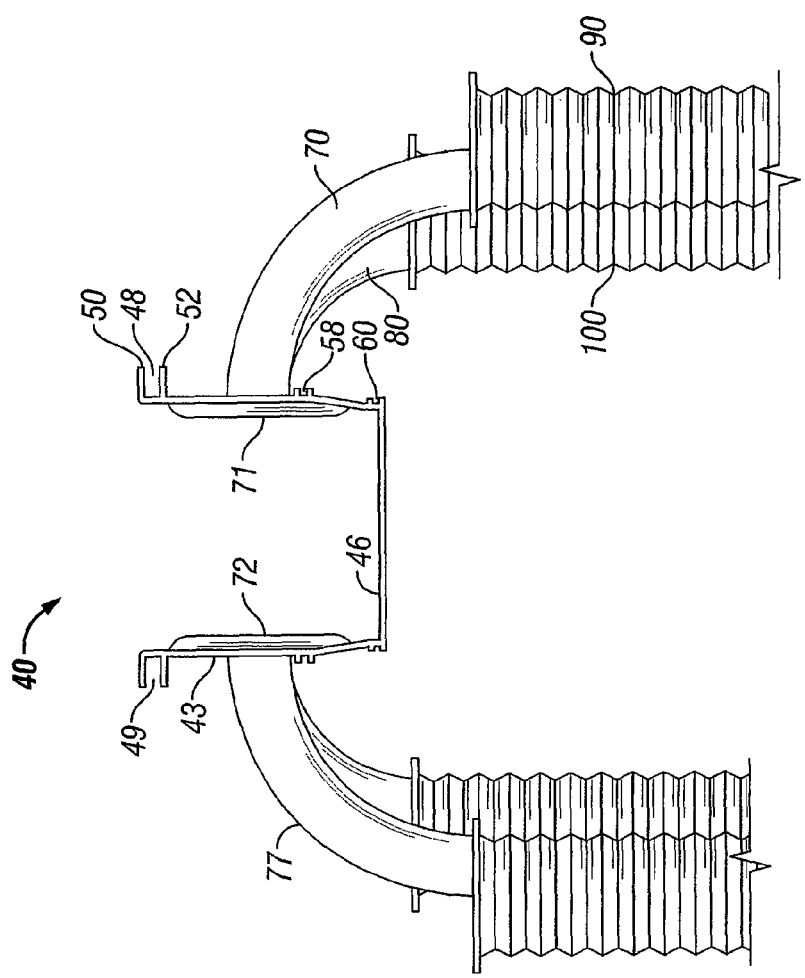
FIG. 4 is an end view of one end of the duct of the present invention in use enabling the dropping of cables to computing equipment.

The present invention provides a method for dropping of fiber-optic, or other sorts of cabling from a duct or other systems using a novel punch tool device which enables the user to drop the cable at any location along a duct without significant time and effort, and without significantly compromising the structural integrity of the duct.

The subject matter of the present invention is described with specificity to meet statutory requirements. However, the description itself is not intended to limit the scope of this patent. Rather, the inventors have contemplated that the claimed subject matter might also be embodied in other ways. First, to include different physical configurations. Second, to include different, steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

You will note the use of the terms aperture and hole throughout this application. Each of these terms is to be given it's broadest meaning. The terms are intended to include any type of opening. E.g., holes, gaps, or slits would all fall within the definitions of each of these terms. The use of either term should not be construed as imparting any specific shape unless otherwise specified.

FIGS. 2 through 5 show the duct system of the present invention. FIG. 2 shows a side view of one section of a duct 40 which has been prepared using the methods and devices of the present invention. Pursuant to these methods and devices, a hole, or plurality of holes will be formed in a duct. This duct will be one known to those skilled in the art. In this case, however, holes will be made in the walls of the duct. Referring to FIG. 2, we see from the side that a first selectively-located hole 64 has been formed in a side wall 45 of duct 40. These apertures may also be seen in FIG. 3. Referring to FIG. 3, it is seen that apertures 64 and 86 exist, in the depicted embodiment, in the sides of the duct. They will be used to remove and drop cables from the duct 40 in a method to be described hereinafter.

Structurally speaking, the duct has a trough shape. The trough-shaped duct has an upper portion 42 and a lower portion 44. It also has two ends 54 and 56. In perspective (see FIG. 3) or cross section (see FIG. 4), it may be seen that the duct has first side 43 and a second side 45. The duct also has a floor 46 which along with sides 43 and 45 defines the trough shape of the duct. The bulk of the cabling will be run through the trough which comprises sides 43 and 45 and the floor 46—all of which are longitudinally extending and together define the trough shape of the duct.

Provided on top of the duct, a lid may optionally be installed (not pictured) to protect the cabling from above. The lid snaps onto and closes off the top of the trough along its entire length. It can be snapped on or off to create access to the cables included in the trough. These lids are well known to those skilled in the art, and are the most conventional way to top off the duct. The snapping in of the lid is done into lid-receiving channels. A first lid receiving channel 48 travels along the top of longitudinally extending side 45. An identical lid receiving channel extends along the upper part of the longitudinally extending opposite side 43 of the duct. Channel 48 is defined by a first ridge 50 and a second ridge 52 formed on the second side 45 of the duct. An identical arrangement is disposed on the other side 43 (not specifically labeled). In inwardly formed member on each side of the lid is used to snap in on top of the duct in a fashion that will be well known to those skilled in the art.

Side 45 also has a first plurality of reinforcing ribs 58 and a second plurality of reinforcing ribs 60 below the first plurality. These are used to reinforce the duct and give it more structural integrity.

In FIG. 2 selectively-located holes 64 and 68, in the disclosed embodiment, have been created using a punch-tool 110 of the present invention. Punch tool 110, shown in FIGS. 6-9, is used to cut out holes in the side walls of the relatively thick (normally ⅛ inch) duct with relative ease.

Figures 8, 9:
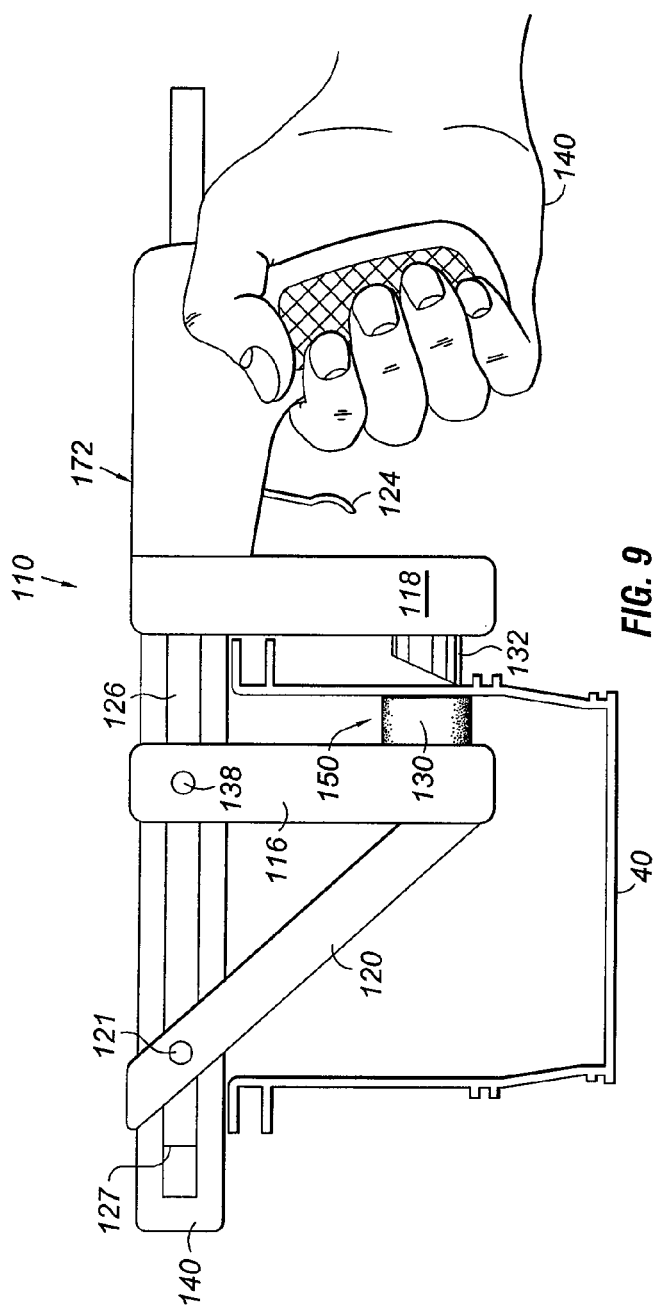
FIG. 8 is a sectional view of section 8-8 taken out of FIG. 7.
FIG. 9 is a side view of the punchout tool in use cutting a hole in the side wall of a section of duct.

The punch tool comprises a first jaw 118 and a second jaw 116. The first and second jaws are adapted to receive a duct wall there between, as shown in FIG. 9. The first jaw includes a tubular cutting blade 132 which projects from an inner engagement face 144 of the first jaw and points inward. Blade 132 is what will be used to cut the hole. Its cutting abilities are enhanced by the blade's tubular shape, thus having a circular cross section, and is truncated at an angle 148. A rounded/leading edge 152 of blade 132 is the first part of the angularly truncated cutting blade to pierce the duct side wall. Alternatively, the blade could be configured as a tubular blade which is truncated perpendicularly, rather at an angle. In such a case, all of the portions of the circular blade will engage the duct wall at the same time. Though this alternative embodiment might require more force to cut through the duct wall, it is likely that the blade would be more durable.

The blade on the first jaw 118 works in concert with a blade-receiving reciprocating portion 150 on an inside face 146 on second jaw 116. This blade-receiving reciprocating portion 150 engages the other side of said wall when the cut is being made, and comprises a tubular inside sleeve 131 which is constructed of metal. This inside sleeve 131 has a substantially tubular shape. The inside of the tubular sleeve 131 has an inside diameter which is slightly greater than the outside diameter of blade 132. This diametric fitting allows blade 132 to be easily slid into the inside sleeve 131 of receiving reciprocating portion 150 when a cut is made.

On the outside of the tubular inside portion is an elastic compressible sleeve 130. This sleeve 130 surrounds and is longer than the inside tubular portion 131. Because sleeve 130 is longer than the inside tube 131, it will engage the inside surface of the side wall of the duct before the inner sleeve when a cut is made. This places the outer sleeve 130 into compression before the inner sleeve 131 is engaged. This engagement of the inside duct wall by the outer sleeve before the cut is made will damp vibrations during the cutting process.

Another benefit of the receiver 150 is its ability to avoid the cutting of cables. Part of this ability relates to the preparation which will be made before the cut is made. As those skilled in the art will be familiar, a trough is normally filled with a certain number of cables which lay at the bottom of the duct. Ducts tend to not be filled all the way to the top. Without a receiver like portion 150, it would be difficult for the user to know where the blade was going to come through the wall relative to the cables inside. Because of the receiver, however, the user is able to reach over the side wall into the duct (even if the duct is located proximate the ceiling) and physically feel around for the receiver 150 relative to all the cables in the duct. Because the user will know that the blade is going to be received within the receiver 150 when the blade makes the cut, that user will also know that so long as he or she keeps the cables out of the cutting zone inside portion 150, no cables will be accidentally severed. This dramatically reduces the risk involved in cutting the side wall.

Other methods of creating these holes would not have this benefit. The user of a knife or saw will always risk nicking a cable. The same is true of drilling. One skilled in the art knows that damaging cables can be costly. These cables must be replaced in long sections. Thus a small cut necessitates the replacement of a large cable section which is expansive. The time involved to repair the problem is also significant. Portion 150 of the punch tool avoids these pitfalls.

Jaws 116 and 118 are driven together to make the cut using an actuator system. In the FIGS. 6-9 embodiment, the actuator system includes a slide bar 126. Slide bar 126 slides linearly between an upper elongated member 115 and a lower elongated member 113. Members 115 and 113 slideably secure bar 126 from above and below respectively. These elongated members are a common end 140 which is at a location at which each of the elongated members are most distal the jaws. This common end limits the translation of an end 127 of bar 126 to the left (referencing FIG. 7). At the other end, elongated members 113 and 115 are each fixed or made integral with the inside upper portion of first jaw 118. Thus, members 113, end 140, and jaw 118 are all fixed to one another.

Figure 6:
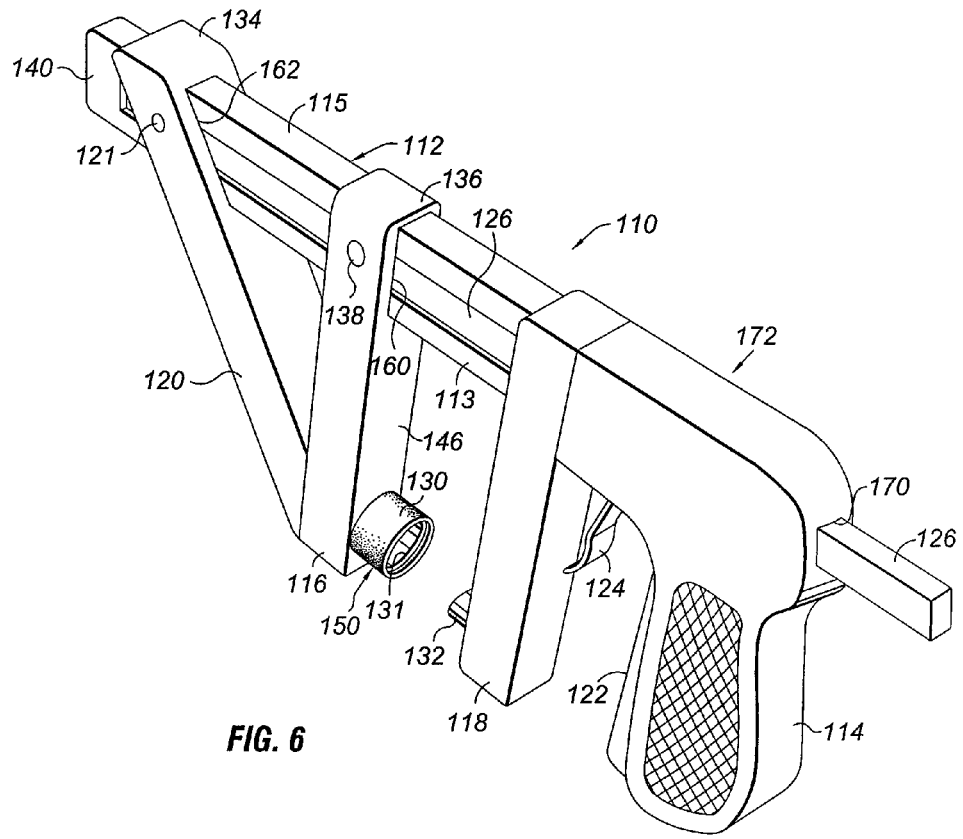
FIG. 6 is a perspective view of the punchout tool of the present invention.
Figure 7:
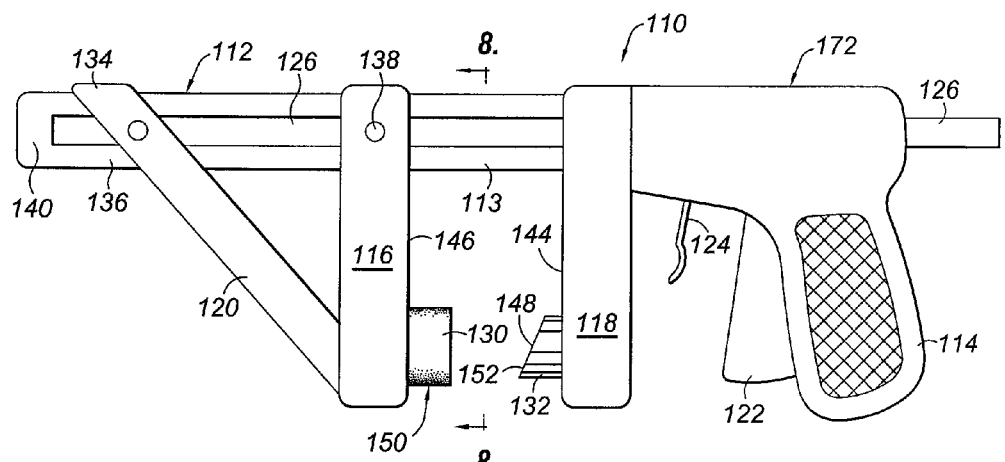
FIG. 7 is a side view of the punchout tool of the present invention.

Slide bar 126 is fixed to second jaw 116 from two sides by a connector rod 138. Though FIGS. 6 and 7 show this rod only from one side, it should be understood that this rod is either fixed to (e.g., by welding) or made integral with slide bar 126. The portion of jaw 116 which supports receiver 150 will receive the force caused by the side wall of the duct bearing against it during the cut. Because of this, one end of an angled support 120 is fixed by welding or made integral with jaw 116 to provide additional structural reinforcement at this location. At the other end of angled support 120, a connecting rod 121 is either fixed or made integral with slide bar 126 so that it is secured thereto. Thus, all of jaw 116, support 120, and bar 126 are fixed together, and thus, slide together as directed by the slide bar 126.

The upper portions of support 120 and jaw 118 each slidingly receive the elongated members 113 and 115. Support 120 receives them in an corridor 162. Corridor 162 is a passageway through support 120 having a rectangular cross section. The upper portion of jaw 118 slidingly receives the elongated members 113 and 115 through a corridor 160 which is a passageway having a rectangular cross section. Each of corridors 160 and 162 are sized within close tolerances of the outer surfaces of the elongated members 113 and 115. These tolerances are liberal enough that sliding is permitted, but conservative enough that no play is created in jaw 116 which might create problems lining up receiver 150 with blade 132.

Another component of the actuator system is a driver assembly 172. Driver assembly 172 includes an incremental advancement lever 122 which incrementally converges second jaw 116 towards first jaw 118 to cause blade 118 to cut through a duct wall. Advancement lever 122 is incorporated into a handle 114. This is done in a fashion which will be recognized by one skilled in the art (see also next paragraph).

This driver arrangement will enable the user to pull the slider bar 126 into the jaw 118/driver/handle assembly through a receiving corridor 170. Receiving corridor 170 which has a rectangular cross section, goes all the way through the upper portion of first jaw 118 and driver assembly 172 and comes out the back side.

Driver assembly 172 also includes a release lever 124. Release lever 124 is used after the cut is made. Upon triggering of release member, slide bar 126 will become disengaged and it and jaw 116 will slide freely.

The driver mechanism discussed herein is conventional in nature. One example of such an arrangement may be seen in FIGS. 1-4 of U.S. Pat. No. 5,222,420 issued to Sorensen et al. Another patent showing a driver system which would work with the present invention is U.S. Pat. No. 6,648,315 issued to Lee. The entire contents of the Sorensen and Lee patents are herein incorporated by reference. One skilled in the art will recognize that these as well as numerous other driver mechanisms could be used to accomplish the objectives here, and that the scope of the present invention should not be limited to any particular driver arrangement.

It is important to note that other methods of weakening the duct wall, such as preconfiguring it with perforations to form knock-out portions, could be employed to form the apertures. Also, the wall could simply be thinned out along the outline. Chemical agents could also be employed to chemically weaken the outline.

Alternatively still, simple holes could be drilled into the duct instead of using the punch tool. These holes could simply be pre-manufactured as part of the molding process, or actively removed through drilling. Other cutting processes could also be used instead which would still fall within the scope of this invention.

FIGS. 2-5 show that duct 40 already has a plurality of selectively positioned apertures (apertures 64, 68, and others) which have been cut out using the punch tool as described above. Though not shown in FIG. 2, there are also holes selectively cut out into back side 43. Though these back side apertures are not pictured in FIG. 2, there are inherently evident in FIGS. 3 through 5.

Though apertures 64 and 68 are seen in FIG. 3 as being in the side wall 45 of the trough, it is important to note that these apertures could also be formed in the lid (not shown) or elsewhere if convenient for dropping the cables in a particular location.

Duct 40 of the present invention could be used alone, as it is pictured in FIG. 2 with cables being removed through the duct through the holes directly into split tubing and then run to the equipment as desired.

The preferred embodiment is provided, however, with downspouts. These optional downspouts are used to protectively conduct the cabling into split tubing. A first downspout 70 is disclosed in FIGS. 3 through 5. This downspout has a 3 inch radius of curvature. This particular radius of curvature enables the spout to be more practical for use in common cable running applications. E.g., for use with particular kinds of fiber optic cable types which cannot be bent beyond a particular extent radially. The radius of curvature of the downspout could be adapted to be used with different kinds of cable or to deliver the cable to particular kinds of server arrangements.

Downspout 70 has essentially two parts. A grommet 71 (see FIG. 4, grommet 71 is not shown in FIGS. 3 and 5) and a spout 74. Grommet 71 defines a hole through which the dropped cables will be run. This hole, though not particularly visible in the figures, is the same as a hole 79 defined through an opposite downspout 77. The grommet 71 serves to retain downspout 70 into the duct from within. To do so, grommet 71 bears against the inside surface of the duct to hold the downspout within it. Spout 74 is used to fit through the inside 66 of aperture 64 and includes a guide channel 76. The selected fibers/cables will be slid down this channel 76 and into corrugated split-tubing in a manner which will be described hereinafter. It also protects the cable which is run through it.

Downspout 70 is installed into the duct by inserting a first end 75 of the downspout through hole 64 and sliding the downspout through the hole until the inside surface of grommet 71 engages the inside surface of the duct, as can be seen in FIG. 4.

Figure 5:
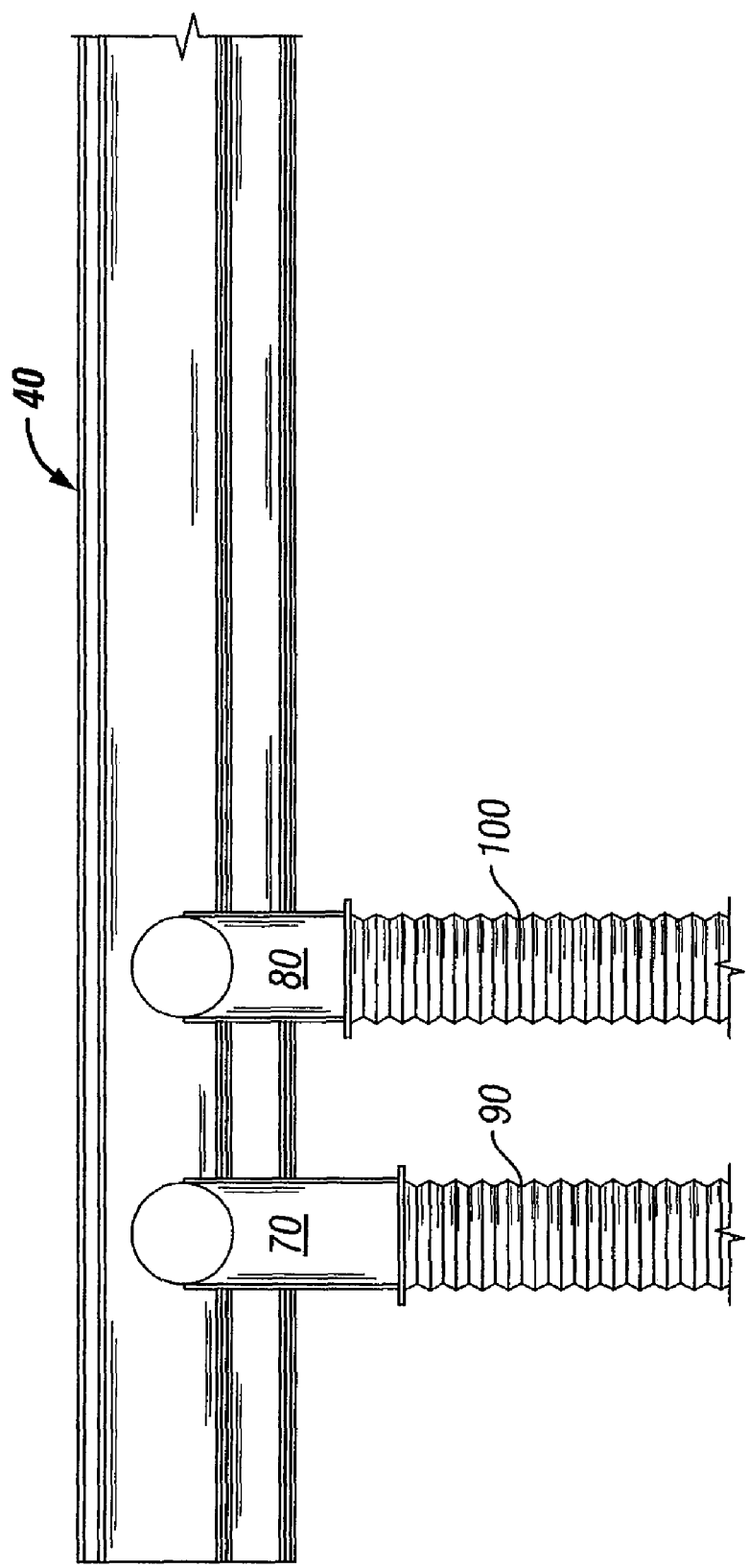
FIG. 5 is a side view of one end of the duct of the present invention in use enabling the dropping of cables to computing equipment.

FIG. 4, as well as FIGS. 3 and 5 shown that the opposite side 43 of the duct 40 includes a downspout 77 which extends from the other side of the duct. See FIG. 4. It has a grommet 72, just like grommet 71 of downspout 70. In fact, downspout 77 is essentially a mirror image of downspout 70, and is installed in the same manner as well.

The guide channel 76 of spout 74 of downspout 70 has a cable receiving inside surface which is adapted to receive the cable and drop it into a split tubing 90 shown below. First end 71 of the spout 74 is adapted with an outer radius which makes it able to be force fit within the standard inside diameter of a typical split tubing, e.g., split tubing 90. For installation purposes, the downspout is slid into through hole 64, then the selected cables to be dropped at that point are slid down cable receiving inside surface 76 into split tubing 90, and then an outside surface 78 of spout 74 is forcibly slid into the split tubing 90. Because the radius of outside surface 78 is slightly greater than the inner diameter of split tubing 90, the force fit will be enabled.

A second downspout 80 with a 2 inch radius of curvature is disclosed being installed through a second hole 86 in duct 40. This downspout 80, like the first downspout, will have a grommet like that disclosed for downspout 70. Though the grommet on downspout 80 is not shown, it would be the same as grommet 82 shown on a downspout opposite (in side 43). This not-pictured grommet will retain downspout 80 within the duct in the same manner disclosed for downspout 70 already. Essentially, downspout 80 is identical to downspout 70, except that its radius of curvature has been minimized. This makes it more apt for different applications. For example, it may be advantageous with some server-rack configurations to drop the cabling more tightly to the duct. One skilled in the art will recognize that different radii of curvature for different downspouts could be used for different kinds of applications in order to drop cabling at different distances from duct 40. All of these different curvatures and displacements should be considered within the scope of the present invention, and the present invention is not of course limited to the two radii of curvature identified here. Other radii or even configurations could be used and still fall within the scope of the present invention.

Also evident from the above disclosed is that for an aperture to be formed in the lid of the duct or elsewhere to meet allow removal of the cables in other types of applications.

Though the installation techniques used with the present invention may be already somewhat evident, they are essentially the steps of first creating the apertures (or knockouts) in one of said sides of the duct. Because of the punch out tool, the apertures may be located anywhere.

This may be seen in FIGS. 2-5. The preferred embodiment disclosed has holes punched along both sides (43 and 45) of the duct 40. These holes are formed using the punch out tool.

Figure 10:
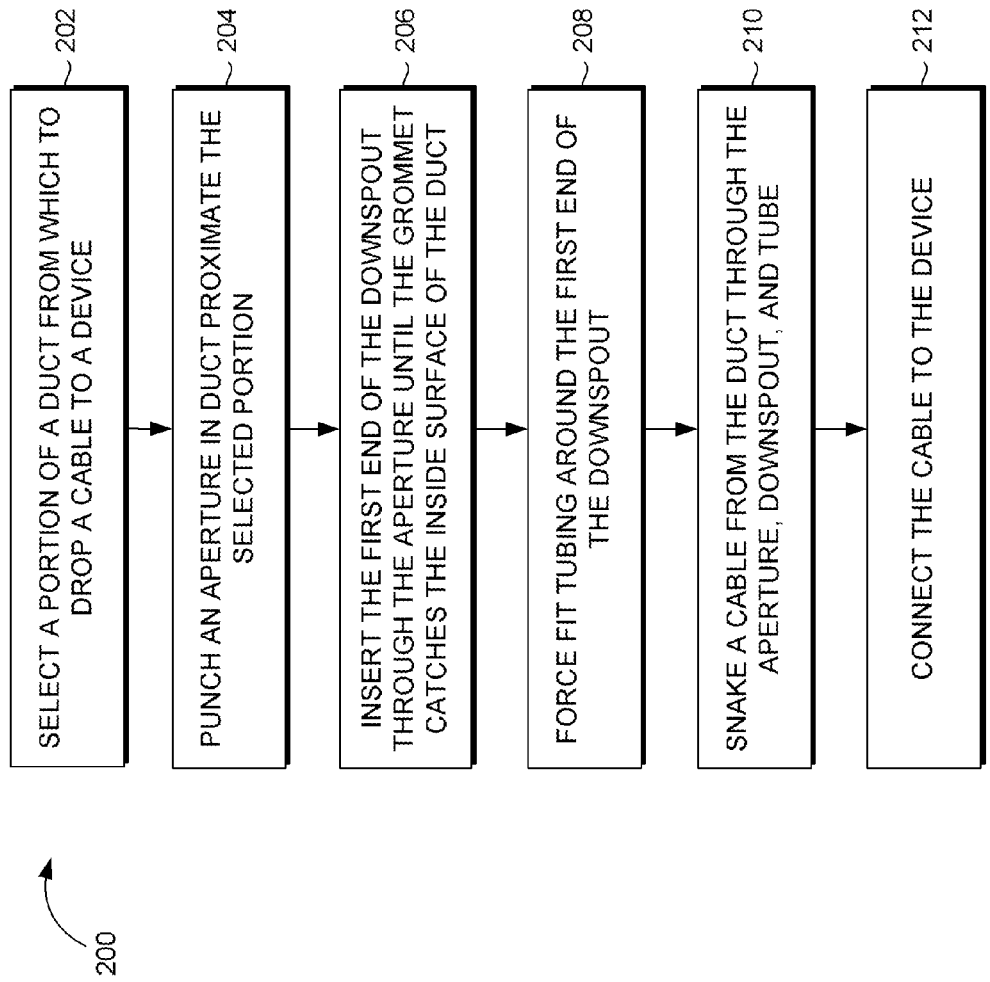
FIG. 10 is a flow chart depicting an illustrative method of running cables from a duct to devices in accordance with embodiments of the invention.

Turning to FIG. 10, a flow chart depicts an illustrative method 200 of running cables from a duct to devices in accordance with embodiments of the invention. Once a duct has been installed, typically along the ceiling of a facility, it will be likely that a systems administrator will eventually have to drop groups of cables from the duct over time. When this is necessary, the user will select a portion of the duct from which to drop one or more cables to one or more devices, as shown at step 202, and the user will physically remove the lid of the duct proximate a location into which a single, or a plurality of cables need to be dropped. The user will then use the punchout tool to create a hole in the duct, as shown at step 204. This will be accomplished by the user visibly (if possible) or by feel (more likely) arranging the blade receiver 150 adjacent an inside wall of the duct in an area proximate the drop is desired to be made. The user is able to assume that any cable not within the cylindrical volume of the receiver 150 is safe from accidental cutting. The user will then compress the lever 122 to cause the second jaw 116 to move towards the blade 132 on first jaw 118. Once the leading edge 152 of blade 132 reaches the outside of the duct side wall, the flexible outer sleeve 130 of blade receiver will engage the inside wall of the duct, placing it in compression. When compressed to an extent, the rigid inner sleeve 131 will then engage the inner surface of the side wall, and flexible outer sleeve 130 is then at maximum compression. At that point, or upon the institution of additional force using lever 122 applied by a hand 140 of the user (see FIG. 9), the leading edge 152 of blade 132 will pierce the side wall. Further advancement using lever 122 will result in a circular aperture, such as apertures 64 and 68, being formed in the duct wall. A circular disk of scrap (not shown) will exist within receiver 150. This scrap piece may easily be removed and then discarded. Thus, an aperture has been created which will enable the accomplishment of the objectives of the present invention.

After the hole has been created, in the preferred method, a downspout will be installed. As shown at step 206, this is done by inserting the spout portion, e.g., first end 75 of spout 70 through the aperture 64 created. The insertion is done by first positioning the downspout 70 such that it is curved upward. After its full insertion, it will then be curved downward such that it depends from the duct. It will be held in by the grommet 71.

Once the downspout 70 has been fully inserted, the split tubing 90 can be forced fit around the spout at first end 75, as shown at step 208. As described above, this is a forced fit. The spout will then be securely held within the tubing. Tubing 90 will then be run to the equipment in a manner known to those skilled in the art.

Now that the spout and tubing have been installed, the user is ready to run the cable intended to be dropped. As shown at step 210, this is done by simply snaking it from inside the duct, through the spout, down the tubing, and to the equipment where it will be connected, as indicated at step 212.

Once the necessary connections have been made, the remaining cables from the duct are resituated in the duct, and the lid is reinstalled. The process is then complete.

Again, the ducting system of the present invention is a significant improvement over the prior art available. The ducting of such systems is typically of such a thickness, e.g., at least ⅛ inch thick, such that it is difficult if not impossible to cut through it with a utility knife or other conventional tool used by a technician in the field. Because punchout tool 110 is able to safely create holes within the duct's sides, the holes created enable the user to gain access at any point along the duct if necessary in order to drop fibers. This gives the technician great levity in terms of accessing different cables at different points and then dropping them to equipment as desired.

And all of this is accomplished without risk of damaging the cables in the duct during the punchout process.

As can be seen, the present invention and its equivalents are well adapted to provide a new and useful equipment housing which may be used to monitor equipment. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of running cables from an already-installed cable duct to devices, the method comprising:
   selecting a first portion of said duct from which it is desirable for a first cable to be dropped to a first device below said duct, wherein said duct is situated along a ceiling above said first device;
   punching a first aperture in said first portion of said duct;
   providing a downspout having first and second ends;
   inserting said first end through said first aperture, causing the first end to extend from said duct;
   snaking the first cable from said duct through said aperture;
   running said first cable through said downspout;
   connecting said first cable to said first device;
   selecting a second portion of said duct from which it is desirable for a second cable to be dropped to a second device below said duct, wherein said duct is situated along the ceiling above said second device;
   punching a second aperture in said second portion of said duct;
   snaking said second cable from said duct through said second aperture; and
   connecting said second cable to said second device.

2. The method of claim 1, comprising:
   configuring said downspout to have a radius of curvature which prevents excessive bending of said cable.

3. The method of claim 2, comprising:
   disposing a grommet on said second end of said downspout;
   catching said grommet on an inside surface of said duct; and thus retaining said second end of said downspout in said duct.

4. The method of claim 3, comprising:
   sizing said first end of said downspout such that it may be force fit into an inner surface of a standard piece of ribbed split tubing.

5. A method of running cables from an already-installed cable duct to devices, the method comprising:
   selecting a portion of said duct from which it is desirable for said cable to be dropped to a device below said duct, wherein said duct is situated along a ceiling above said device;
   punching an aperture in said selected portion of said duct, wherein said punching includes:
      providing a tool having a first jaw and a second opposing jaw, said jaws adapted to receive a duct wall there between;
      disposing a cutting blade on said first jaw;
      providing a reciprocating portion on said second jaw for engaging a second side of said wall; and
      moving said first and second jaws towards one another to cut out the aperture;
   snaking the cable from said duct through said aperture; and
   connecting said cable to said device.

6. The method of claim 5 comprising:
   configuring said blade to be substantially tubular and to have an outside diameter;
   making said reciprocating portion to have a substantially tubular body which has an inside diameter which is slightly greater larger than said outside diameter of said blade;
   receiving said blade in said reciprocating portion when a cut is made.

7. The method of claim 5 comprising:
   using said reciprocating portion to prevent the accidental damaging of cables.

* * * * *